US010106317B2

(12) United States Patent
Keay

(10) Patent No.: US 10,106,317 B2
(45) Date of Patent: Oct. 23, 2018

(54) SHOCK ISOLATION SYSTEM

(71) Applicant: The Skydyne Company, Port Jervis, NY (US)

(72) Inventor: Peter Keay, Shohola, PA (US)

(73) Assignee: THE SKYDYNE COMPANY, Port Jervis, NY (US)

( * ) Notice: Subject to any disclaimer, the term of this patent is extended or adjusted under 35 U.S.C. 154(b) by 27 days.

(21) Appl. No.: 15/114,253

(22) PCT Filed: Feb. 4, 2015

(86) PCT No.: PCT/US2015/014375
§ 371 (c)(1),
(2) Date: Jul. 26, 2016

(87) PCT Pub. No.: WO2015/119993
PCT Pub. Date: Aug. 13, 2015

(65) Prior Publication Data
US 2017/0008442 A1     Jan. 12, 2017

Related U.S. Application Data

(60) Provisional application No. 61/935,585, filed on Feb. 4, 2014.

(51) Int. Cl.
*B65D 90/14*     (2006.01)
*B60P 7/18*     (2006.01)
(Continued)

(52) U.S. Cl.
CPC ............... *B65D 90/14* (2013.01); *B60P 7/18* (2013.01); *B65D 88/022* (2013.01); *B65D 90/22* (2013.01);
(Continued)

(58) Field of Classification Search
CPC . B60P 7/18; B60P 7/16; B65D 88/129; B65D 90/14; B65D 90/22; F16F 9/26;
(Continued)

(56) References Cited

U.S. PATENT DOCUMENTS 3,754,803 A * 8/1973 Underwood ........... B65D 81/07
217/55
3,980,185 A     9/1976 Cain
(Continued)

FOREIGN PATENT DOCUMENTS

FR     1114491 A * 4/1956 ................ F16F 9/28
GB     750522 A * 6/1956 ................ F16F 9/28
(Continued)

OTHER PUBLICATIONS

Int'l Preliminary Report on Patentability dated Aug. 18, 2016 in Int'l Application No. PCT/US2015/014375.
(Continued)

*Primary Examiner* — Eret C McNichols
(74) *Attorney, Agent, or Firm* — Panitch Schwarze Belisario & Nadel LLP

(57) ABSTRACT

A shock isolation system includes at least one isolator configured to be removably secured to an exterior of a container and at least one foot in communication with the at least one isolator and configured to contact a support surface. The isolator has a first end proximate the support surface and an opposing second end distal from the support surface, and is configured to transition between a first, contracted position and a second, expanded position. In a stowed configuration of the system, the isolator is in the contracted position and a bottom end of the container is spaced apart from the foot at a first distance. In a deployed configuration of the system, the isolator is in the expanded position and a bottom end of the container is spaced apart (Continued)

from the foot at a second distance which is greater than the first distance.

14 Claims, 4 Drawing Sheets

(51) Int. Cl.
| | |
|---|---|
| *B65D 88/02* | (2006.01) |
| *B65D 90/22* | (2006.01) |
| *F16F 7/00* | (2006.01) |
| *F16F 9/28* | (2006.01) |
| *F16F 9/06* | (2006.01) |
| *B65D 88/12* | (2006.01) |
| *F16F 9/26* | (2006.01) |
| *B60P 7/16* | (2006.01) |
| *F16F 9/53* | (2006.01) |
| *F16F 15/027* | (2006.01) |

(52) U.S. Cl.
CPC ...... *F16F 7/00* (2013.01); *B60P 7/16* (2013.01); *B65D 88/129* (2013.01); *F16F 9/062* (2013.01); *F16F 9/26* (2013.01); *F16F 9/28* (2013.01); *F16F 9/53* (2013.01); *F16F 15/027* (2013.01)

(58) Field of Classification Search
CPC .... F16F 9/28; F16F 9/53; F16F 15/027; F16F 9/062
USPC .......... 248/562, 615, 616; 414/138.2, 139.4, 414/139.6, 139.9, 140.3, 140.4, 141.7
See application file for complete search history.

(56) References Cited

U.S. PATENT DOCUMENTS

| | | | | |
|---|---|---|---|---|
| 4,151,925 A | | 5/1979 | Glassmeyer | |
| 4,174,188 A | * | 11/1979 | Brun | B66C 13/02 212/308 |
| 5,154,561 A | * | 10/1992 | Lee | B63B 27/12 114/264 |
| 5,332,070 A | * | 7/1994 | Davis | F16F 9/16 188/280 |
| 5,624,225 A | * | 4/1997 | Cox | B60P 1/6427 414/495 |
| 5,918,865 A | | 7/1999 | Osterberg | |
| 6,237,795 B1 | | 5/2001 | Buckley et al. | |
| 6,435,796 B1 | * | 8/2002 | Iversen | B63B 25/004 414/139.6 |
| 6,640,941 B2 | | 11/2003 | Taylor | |
| 6,837,343 B1 | * | 1/2005 | Bugaj | B60G 21/073 188/304 |
| 6,936,820 B2 | * | 8/2005 | Peoples | B66C 19/002 250/336.1 |
| 7,052,226 B1 | * | 5/2006 | Hoot, Jr. | B65G 63/004 414/140.3 |
| 7,610,934 B2 | * | 11/2009 | Naciri | B63B 27/24 137/615 |
| 7,891,922 B2 | * | 2/2011 | Fukuda | B60P 7/18 410/46 |
| 8,561,943 B2 | * | 10/2013 | Crook | B64D 27/18 244/54 |
| 8,590,720 B2 | | 11/2013 | Thomas, II | |
| 8,973,885 B2 | * | 3/2015 | Bonnet | F16C 7/04 244/54 |
| 9,062,737 B2 | * | 6/2015 | Hoult | F16F 9/26 |
| 9,080,631 B2 | * | 7/2015 | Hoult | F16F 9/06 |
| 2007/0235459 A1 | * | 10/2007 | Huddleston | B65D 19/40 220/632 |
| 2008/0135546 A1 | * | 6/2008 | Smith | B65D 88/129 220/1.5 |
| 2009/0000526 A1 | * | 1/2009 | Looker | B65D 88/12 108/57.12 |
| 2009/0200983 A1 | * | 8/2009 | Dyer | H02J 7/32 320/107 |
| 2011/0170988 A1 | * | 7/2011 | Perry | B63B 27/30 414/138.2 |
| 2013/0233760 A1 | * | 9/2013 | Polando | B65D 81/02 206/591 |
| 2014/0102885 A1 | * | 4/2014 | Devine | F17C 3/025 204/267 |
| 2015/0321734 A1 | * | 11/2015 | Woldring | F16L 1/205 414/139.6 |
| 2016/0068236 A1 | * | 3/2016 | Van Der Tempel | B63B 27/14 414/139.6 |
| 2016/0160952 A1 | * | 6/2016 | Schaedler | F16F 7/121 188/377 |

FOREIGN PATENT DOCUMENTS

| | | |
|---|---|---|
| JP | 2005132328 A | 5/2005 |
| RU | 2491185 C1 | 8/2013 |
| SU | 1224196 A1 | 4/1986 |

OTHER PUBLICATIONS

Int'l Search Report dated May 7, 2015 in Int'l Application No. PCT/US2015/014375.

\* cited by examiner

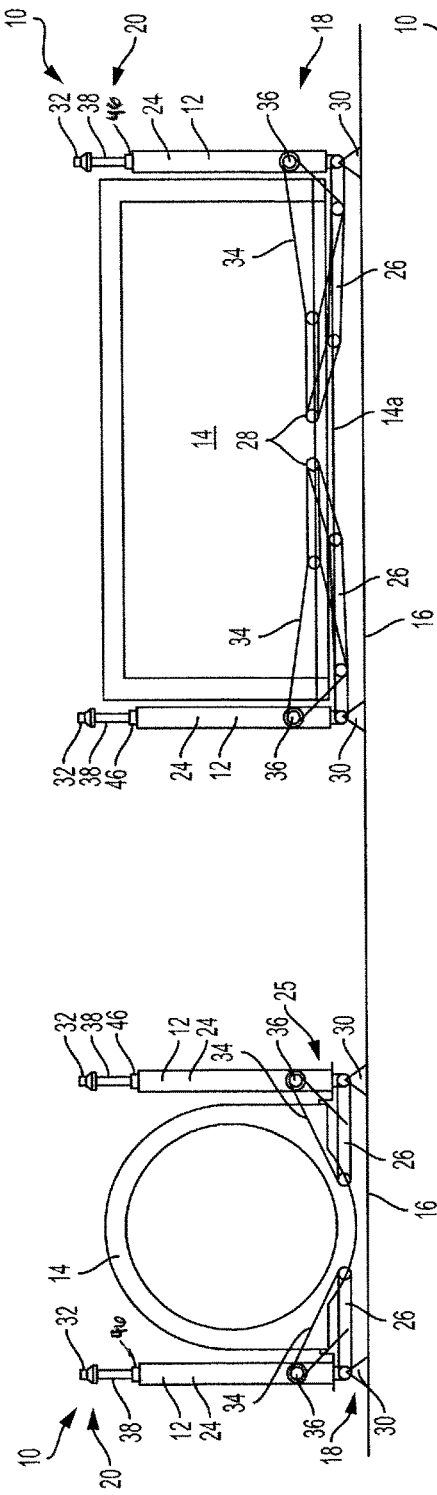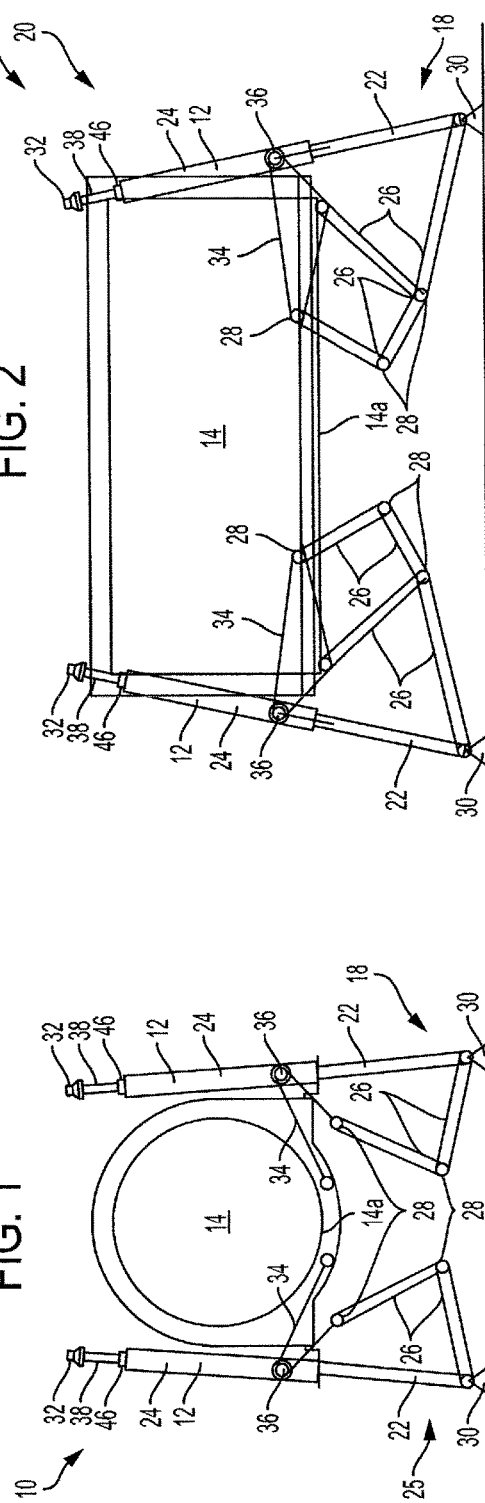

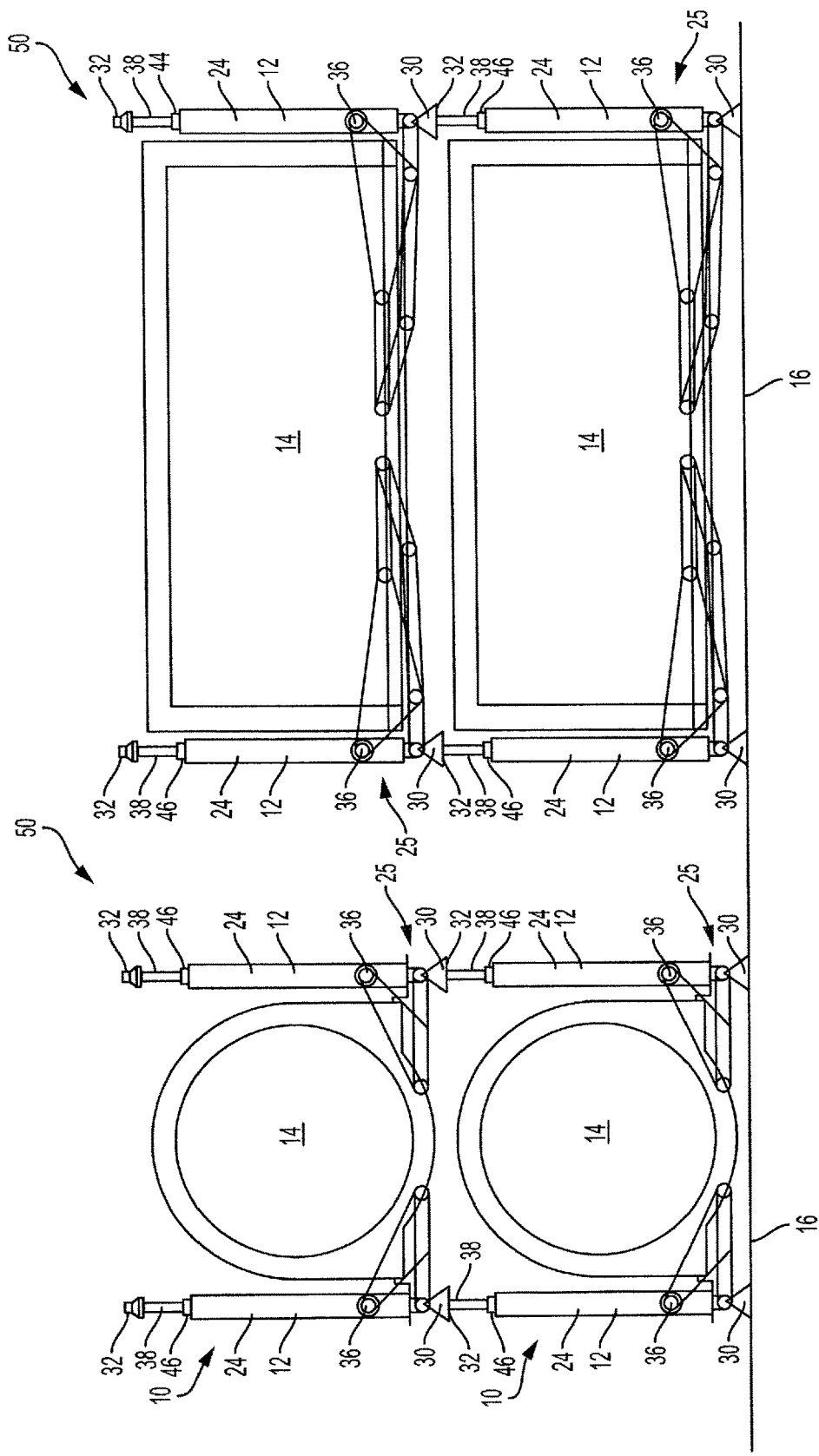

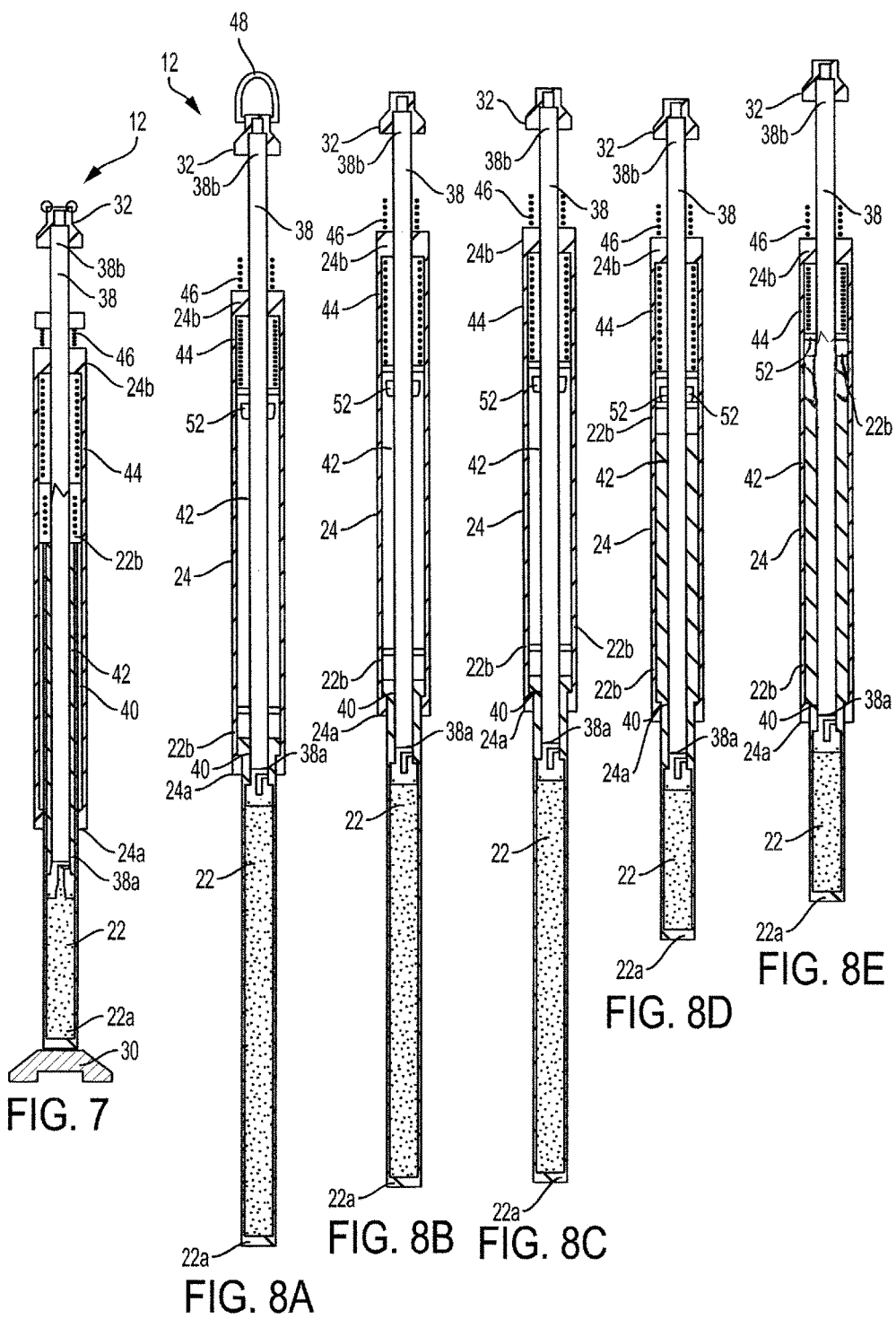

SHOCK ISOLATION SYSTEM

CROSS-REFERENCE TO RELATED APPLICATION

This application is a section 371 of International Application No. PCT/US2015/014375, filed Feb. 4, 2015, which was published in the English language on Aug. 13, 2015 under International Publication No. WO 2015/119993 which claims the benefit of U.S. Provisional Application No. 61/935,585, filed Feb. 4, 2014, the disclosures of which are incorporated herein by reference.

BACKGROUND OF THE INVENTION

The present invention relates to a shock isolation system for containers, and more particularly a shock isolation system for protecting sensitive cargo of containers during transfer of the containers to the deck of a ship at sea.

Containers housing sensitive equipment or cargo, such as jet engines, have traditionally required shock and vibration isolators to protect the cargo contained therein, particularly during helicopter transfer of the containers to a deck of a ship at sea. Typically, such isolators are in the form of elastomeric and/or wire rope coils provided within the container to support the load (i.e., cargo) and allow deflection of the load within the container when the container is subjected to a shock. More particularly, as the container comes into contact with a ship deck and ceases to travel further downward, the velocity and weight of the load contained therein continues to travel due to momentum against the opposing force of the isolators. The energy of the motion of deflection of the load is absorbed by the isolators and converted to heat. Such conversion results in the damping of vibrations and oscillations caused by the shock to the container. As such, the conventional isolators reduce the initial shock impact on the load and provide a certain amount of impact protection.

For all isolators, shock impact protection is provided by deceleration of the load and requires significant deflection of the load, particularly travel beyond the static position of the load. The allowable deflection of the load is therefore directly proportionate to the reduction of the impact upon the load. As such, for maximum shock protection, conventional isolation systems require a large spatial arrangement. That is, the containers must be of a very large size, such that the isolators within the container allow for maximum travel of the load; i.e., travel of the load within the container beyond the static position of the load. For example, with conventional isolators, if 24 inches of deflection in one direction is needed, the container would have to be at least 24 inches larger in the direction of the deflection.

Another well-accepted standard in the shipping industry is that the size of containers, and shipboard containers in particular, be as minimal as possible to facilitate easy handling and transport of the containers and to maximize the number of items that can fit on a particular ship. The minimum size requirement, however, is in conflict with the large container size required by conventional shock isolation systems.

Accordingly, there is a need for a shock isolation system which resolves this conflict. That is, there is a need for a shock isolation system which allows for a minimal container size, but also provides sufficient isolation of the container load against shock impacts.

BRIEF SUMMARY OF THE INVENTION

In one embodiment, the present invention relates to a shock isolation system comprising at least one isolator configured to be removably secured to an exterior of a container and at least one foot in communication with the at least one isolator and configured to contact a support surface. The at least one isolator has a first end proximate the support surface and an opposing second end distal from the support surface, and is configured to transition between a first, contracted position and a second, expanded position. In a stowed configuration of the system, the at least one isolator is in the contracted position and a bottom end of the container is spaced apart from the at least one foot at a first distance. In a deployed configuration of the system, the at least one isolator is in the expanded position and a bottom end of the container is spaced apart from the at least one foot at a second distance which is greater than the first distance.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a front elevational view of a shock isolation system in accordance with a preferred embodiment of the present invention, wherein the shock isolation system is in a stowed configuration;

FIG. 2 is a side elevational view of the shock isolation system shown in FIG. 1 in the stowed configuration;

FIG. 3 is a front elevational view of a shock isolation system in accordance with a preferred embodiment of the present invention, wherein the shock isolation system is in a deployed configuration;

FIG. 4 is a side elevational view of the shock isolation system shown in FIG. 3 in the deployed configuration;

FIG. 5 is a front elevational view of a shock isolation assembly including two shock isolation systems as shown in FIG. 1 in a stacked configuration;

FIG. 6 is a side elevational view of the shock isolation assembly shown in FIG. 5;

FIG. 7 is a cross-sectional view of an isolator of one of the shock isolation systems of the shock isolation assembly shown in FIG. 5;

FIG. 8A is a cross-sectional view of an isolator of the shock isolation system shown in FIG. 3 in a deployed and hoisted configuration;

FIG. 8B is a cross-sectional view of the isolator shown in FIG. 8A in a deployed configuration;

FIG. 8C is a cross-sectional view of the isolator shown in FIG. 8A in a deployed configuration;

FIG. 8D is a cross-sectional view of the isolator shown in FIG. 8A in a partially loaded configuration;

FIG. 8E is a cross-sectional view of the isolator shown in FIG. 8A in a fully loaded configuration.

DETAILED DESCRIPTION OF THE INVENTION

Figure 9:
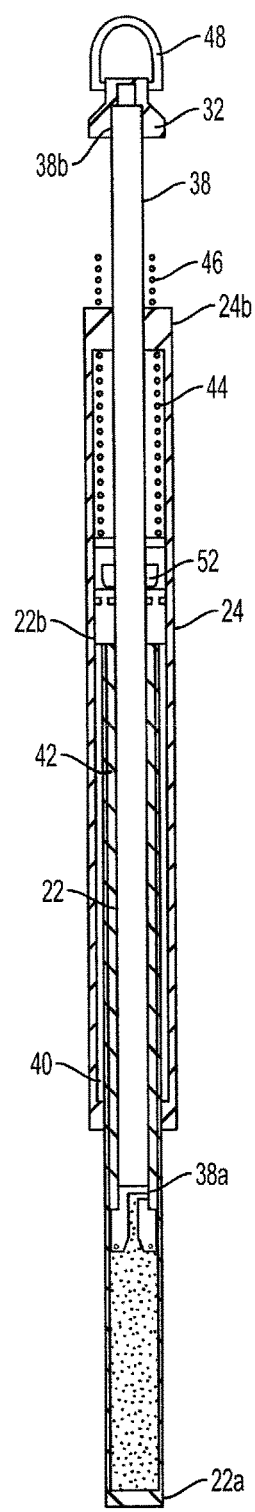
FIG. 9 is a cross-sectional view of a hydraulic isolator in accordance with a preferred embodiment of the present invention.

Certain terminology is used in the following description for convenience only and is not limiting. The words "right," "left," "lower," and "upper" designate directions in the drawings to which reference is made. The words "inwardly"

or "distally" and "outwardly" or "proximally" refer to directions toward and away from, respectively, the geometric center or orientation of the shock isolation system and related parts thereof. The terminology includes the above-listed words, derivatives thereof and words of similar import.

Turning in detail to the drawings, FIGS. 1-9 show various configurations of a shock isolation system and components thereof. In particular, FIGS. 1-4 show a shock isolation system 10 comprising at least one isolator 12, and more particularly a pair of isolators 12, configured to be removably secured to the exterior of a container 14. It will be understood that the container 14 may be configured to be of any shape (e.g., rectangular, square, cylindrical and the like) and orientation. It will also be understood that while the container 14 may be empty, the interior of the container 14 preferably contains cargo or load (not shown). It will also be understood that the isolators 12 need not be secured to the opposing side surfaces of the container 14, as shown in FIGS. 1-6, and instead may be secured to the exterior of the container 14 at any appropriate locations. It will also be understood that the container 14 may be provided with more than two isolators 12.

Each isolator 12 has a first end 18 proximate a support surface 16 and an opposing second end 20 distal from the support surface 16. More particularly, each isolator 12 comprises a first rod 22 having a first end 22a and an opposing second end 22b, a second rod 24 having a first end 24a and an opposing second end 24b, and a third rod 38 having a first end 38a and an opposing second end 38b. The shock isolation system 10 further includes a foot or pedestal 30 configured to contact the support surface 16 and in communication with the isolator 12 and a cap or handle 32 distal from the support surface 16. In one embodiment, the foot 30 is secured to the first end 18 of the isolator 12 and the cap 32 is secured to the second end 20 of the isolator 12. In one embodiment, as shown in FIGS. 8A and 9, each cap 32 is provided with a lifting ring 48. In use, operating equipment, such as a helicopter or a crane (not shown), may grasp each lifting ring 48 to hoist the shock isolation system 10 and transport it from one support surface 16 to another.

It will be understood that the transferor and transferee support surfaces 16 may be of differing types. For example, either the transferor or transferee support surface 16 may be the deck of a docked ship or other stationary ship-based or land-based support surface, such that the container 14 situated thereon will be subjected to minimal shock impact, while the other of the transferor and transferee support surface 16 may be the deck of ship out at sea, such that the container 14 situated thereon will be subjected to a much greater degree of shock impact requiring a greater degree of deflection of the container 14 load.

Referring to FIGS. 5-6, in one embodiment, a shock isolation assembly 50 is formed by stacking a first shock isolation system 10 on top of a second shock isolation system 10 in a direction extending perpendicular to the support surface 16. More particularly, each foot 30 of the first shock isolation system 10 engages each cap 32 of the second shock isolation system 10 to form the stacked configuration of the shock isolation assembly 50. In the stacked configuration, the suspensions of the individual container 14 loads remain vibration and shock isolated. In the stacked configuration, each isolator 12 of the first and second shock isolation systems 10 in a fully compacted or compressed state, as shown in FIG. 7 and as described in detail herein, such that the stacked load is transferred to each foot 30 of the respective system 10. As such, the suspension and isolation of one container 14 load does not affect that of another. It will be understood that the shock isolation assembly 50 of the present invention is not limited to two stacked shock isolation systems 10.

Referring to FIGS. 7-8D, the first rod 22 of each isolator 12 includes an interior bore 40 that extends along at least a portion of a length of the first rod 22. The second rod 24 also includes an interior bore 42 extending along at least a portion of, and more preferably the entirety of, a length of the second rod 24. The second end 22b of the first rod 22 is telescopingly inserted within the interior bore 42 of the second rod 24 via the first end 24a of the second rod 24 and the first end 38a of the third rod 38 is telescopingly inserted within the interior bore 42 of the second rod 24 via the second end 24b of the second rod 24. The first end 38a of the third rod 38 is also telescopingly received within the interior bore 40 of the first rod 22 via the second end 22b of the first rod 22.

Preferably, a first spring 44, such as a suspension spring, is provided within the interior bore 42 of the second rod 24 proximate or at the second end 24b, and a second spring 46, such as an accumulator spring, protrudes from the second end 24b of the second rod 24 and circumferentially surrounds a portion of the third rod 38. The second end 22b of the first rod 22 is configured to contact the first spring 44, such that the first rod 22 is movable and spring-loaded relative to the second rod 24. More preferably, in use, the second rod 24 remains stationary while the first rod 22 is movable within the second rod 24 to contact and separate from the first spring 44. The third rod 38 is also spring-loaded relative to the second rod 24 via the second spring 46. Preferably, the springs 44, 46 in conjunction with the isolators 12 serve as a suspension system to dampen vibration and minor shocks when the container 14 is at rest. In one embodiment, a bumper or dampener 52 is provided within the first spring 44 and the second end 22b of the first rod 22 for further dampening of vibrations and shock to the container 14 load.

Referring to FIG. 9, in one embodiment, each isolator 12 is a hydraulic isolator, such that when the first rod 22 is under compression, hydraulic oil contained within at least a portion of the first rod 22 becomes pressurized and moves at a controlled rate through an orifice and/or valving provided proximate the first end 38a to lower pressure oil contained in the body of the isolator 12.

Referring to FIGS. 1-6, the shock isolation system 10 further includes a control or support assembly 25 proximate the first ends 18 of the isolators 12 and the support surface 16 which is configured to support the container 14. Each support assembly 25 comprises at least one support member 26, and more preferably a plurality of support members 26 (best shown in FIG. 4). In one embodiment, at least one support member 26 of the support assembly 25 is preferably directly connected or otherwise secured to the first rod 22 proximate the first end 18 of the isolator 12. More preferably, the at least one support member 26 is movably connected to the first end 22a of the first rod 22 and/or the foot 30. In one embodiment, the support members 26 are pivotably connected to each other about joints 28, such that the support assembly 25 comprises a plurality of articulated support members 26.

The shock isolation system 10 preferably further comprises a support structure, such as a metal cable, 34 which interconnects at least one of the support members 26 with one of the first and second rods 22, 24 of each isolator 12. More preferably, the metal frame cable 34 extends around at least one of the joints 28 of the support assembly 25, as well as around a protrusion or pivot point 36 provided on the isolator 12, preferably on the second rod 24. The metal cable 34 not only facilitates the support assembly 25 supporting the container 14, but also allows for the isolator 12 to pivot or rotate about pivot point 36 relative to the container 14. More particularly, upon deployment, the body of the isolator 12 preferably pivots or rotates about pivot point 36, such that the cap 32 and the second end 20 of the isolator 12 move inwardly toward the container 14 while the foot 30 and the first end 18 of the isolator 12 move outwardly away from the container 14. Thus, in the deployed configuration, each isolator 12 extends at an angle with respect to the container 14. The rotational/pivoting movement of the isolator 12 allows for an increased distance between the feet 30 and the container 14 in the deployed configuration of the shock isolation system 10, thereby allowing for an increased distance of travel for the container 14 when maximum deflection is required.

It will be understood that the configuration and interaction of the isolators 12, feet 30 and support members 26 are not limited to the configuration illustrated in FIGS. 1-6. That is, the positioning and interaction of these components may vary as necessary to provide the requisite distance between the container 14 and the feet 30 to meet the deflection needs of a particular situation. For example, the support assembly 25 may have more or less support members 26 than shown in FIGS. 1-6. Also, the feet 30 may be secured to one of the support members 26 and spaced apart from the first ends 18 of the isolators 12, or vice versa. More particularly, in one embodiment (not shown), the foot 30 is directly connected to one end of a support member 26 and the first end 18 of the isolator 12 is connected to an opposing end of the same support member 26, thereby allowing for increased distance between the container 14 and the foot 30 while requiring minimal or only partial extension of the insulators 12 in a deployed configuration of the shock isolation system 10.

When the container 14 is stored and at rest on a support surface 16 and the weight of the container 14 load is applied to the isolators 12, the shock isolation system 10 is in a stowed configuration which requires a minimal amount space, as shown in FIGS. 1-2. That is, when the container 14 is at rest on a support surface 16 and the weight of the load contained in the container 14 is applied to the isolators 12, the weight of the container 14 load causes the isolators 12 to transition to a compressed, and preferably fully compressed, state and the support assembly 25 to transition to a folded (and thus compacted or compressed) configuration. More particularly, in the at rest and stored position of the shock isolation system 10, the support assembly 25 is in a folded configuration in which the support members 26 are folded onto each other about the joints 28 and thus occupy a minimal amount of space under a bottom end 14a of the container 14, such that the distance between the bottom end 14a of the container 14 and the support surface 16 is minimal.

Also, as shown in FIG. 8E, the first rod 22 is bottomed out within the interior bore 42 of the second rod 24, such that the first spring 44 is in a compressed orientation, and the third rod 38 is bottomed out within the interior bore 40 of the first rod 22. As such, each isolator 12 is in a contracted or compressed state and the bottom end 14a of the container 14 is spaced apart from the support surface 16 at a first distance which is relatively minimal. More particularly, the bottom end 14a of the container 14 is proximate the support surface 16, such that the shock isolation system 10 overall occupies a minimal amount of space in the at rest and stored position, thereby satisfying the industry preference/standard for minimally-sized containers and container assemblies. It will be understood that the isolators 12 and the support assembly 25 still allow for enough deflection of the container 14 and its cargo or load in the stowed configuration, so as to dampen minor vibrations and/or shocks which may occur while the container 14 is at rest in the stored position.

However, for transfer operations (e.g., movement of the container to a support surface 16) which will cause significant shock impact to the container 14 (e.g., a deck of a ship at sea), maximum shock absorption is required for protection of the container 14 load. Thus, in such scenarios, the deployment mechanism of the shock isolation system 10 is preferably manually or automatically implemented. That is, at some point from the time the container 14 is hoisted (e.g., by the lifting ring 48) from a transferor support surface 16 up to the time the container 14 is set upon a transferee support surface 16 (i.e., at the point of hoisting or any time before the container 14 is set up the transferee support surface 16), the isolators 12 and the support assembly 25 are deployed either automatically or manually.

FIGS. 8A-8E depict the progression of deployment mechanism of the shock isolation system 10. As shown in FIGS. 8A-8C, upon actuation of the deployment mechanism, the isolators 12 and the support assembly 25 transition to a deployed state which provides for a significant distance between the bottom end 14 of the container 14 and the feet 30, such that the container 14 can deflect or travel a great distance if necessary when subjected to a shock impact (see FIGS. 3-4).

More particularly, in the deployed configuration of the shock isolation system 10, the body of the isolator 12 pivots or rotates about pivot point 36, such that the cap 32 and the second end 20 of the isolator 12 are positioned inwardly toward the container 14 and the foot 30 and the first end 18 of the isolator 12 are positioned outwardly away from the container 14 relative to the starting positions of these components in the stowed configuration. Also, the first rod 22 is slid outwardly within the second rod 24 toward the first end 24a of the second rod 24 and the third rod 38 is pulled outwardly within the first and second rods 22, 24 toward the second ends 22b, 24b of the first and second rods 22, 24, such that the second end 22b of the first rod 22 is proximate the first end 24a of the second rod 24 and the first end 38a of the third rod 38 is proximate the second end 22b of the first rod 22. Each isolator 12 is therefore in an expanded state, with vibration and shock dampening being provided by the springs 44, 46 and dampener 52 within each isolator 12.

In addition, as shown in FIGS. 3-4, the support members 26 of the support assembly 25 pivot about the joints 28 to transition into an unfolded state beneath the bottom end 14a of the container 14. As such, the bottom end 14a of the container 14 is spaced apart from the support surface 16 at a second distance which is greater than the first distance. Accordingly, the volume of space occupied by the shock isolation system 10 in the stowed configuration is smaller than the volume of space occupied by the shock isolation system 10 in the deployed configuration.

More particularly, in the deployed configuration, the bottom end 14a of the container 14 is distal from the support surface 16, such that the isolators 12 and the support assembly 25 allow for maximum deflection of the container 14 and its cargo or load, so as to dampen the vibrations and/or shocks which occur while the container 14 is being transferred from a first (i.e., transferor) support surface 16 to a second (i.e., transferee) support surface 16 and/or while the container 14 is set upon one of the transferor and transferee surfaces. Indeed, the deployment of the isolators 12 of the present invention results in far greater available deflection travel than industry standard isolators afford. For example, industry standard isolators for such containers rarely allow for more than eight inches of travel, whereas the present invention preferably allows for approximately thirty inches of travel.

The shock isolation system 10 can be selectively placed in either the stowed configuration or the deployed configuration. More particularly, once placed in either the stowed configuration or the deployed configuration, the shock isolation system 10 may be locked in the respective configuration so as to be prevented from transitioning to the other configuration.

As the container 14 is set upon the second (i.e., transferee) support surface 16, the isolators 12 and the support assembly 25 are the first components to contact the transferee support surface 16. Once the weight of the container 14 load is applied to the isolators 12 and support assembly 25, the weight of the container 14 load causes the isolators 12 and the support assembly 25 to transition to the stowed configuration.

As shown in FIGS. 8D-8E, as the isolators 12 transition to the stowed or compacted configuration, the first rod 22 is slid inwardly within the second rod 24 toward the second end 24b of the second rod 24 and the third rod 38 is slid inwardly within the first and second rods 22, 24 toward the first ends 22a, 24a of the first and second rods 22, 24, such that the second end 22b of the first rod 22 is proximate the first spring 44 and the first end 38a of the third rod 38 is bottomed out within the interior bore 40 of the first rod 22. More particularly, FIG. 8D depicts the second end 22b of the first rod 22 in contact with the first spring 44 as the isolator 12 is in a partially loaded state, while FIG. 8E depicts the fully loaded state of the isolator 12 in which the first spring 44 is fully compressed between the first and second rods 22, 24. In addition, the support members 26 of the support assembly 25 pivot about the joints 28 to transition back to the folded state beneath the bottom end 14a of the container 14.

In one embodiment, further shock and vibration protection is provided by fork skid tubes (not shown) provided on or integrally formed within the support members 26. The container 14 may thus be lifted by the insertion of forks (e.g., of a forklift machine) in the skid tubes, such that the container 14 load would still being suspended and isolated from vibrations and shocks by the isolator system comprised of the isolators 12 and the support assembly 25 during transfer of the container 14.

It will be understood that the isolators 12 need not contact the transferee support surface 16 simultaneously to function properly. It will also be understood that if the transferee support surface 16 is heaving, the isolators 12 are configured to repeatedly contact the transferee support surface 16 without any substantial shock being transferred to the container 14.

The shock isolation system 10 of the present invention enables maximum travel of the container 14 load regardless of the conditions of the load. Therefore, shock dampening may be designed with relatively soft levels during the initial isolator 12 travel (i.e., contacting the support surface 16), because the isolators 12 are not required to support the weight the static load. Consequently, vibrations and shocks by the support surface 16 (e.g., a heaving ship deck) are only very loosely coupled to the container 14 load. However, once the isolators 12 are in firm contact with the support surface 16 and the weight of the container 14 load is applied to the isolators 12 and support assembly 25, the isolators 12 begin to compress or contract (as described above) under the container 14 load. The rate at which the isolators 12 contract or compress is dictated, at least to some degree, by the weight of the container 14 load and its inertia (e.g., the container 14 load being dropped on a support surface 16 from a distance versus being placed gently on a support surface 16). Preferably, smooth deceleration of the descent of the container 14 load is achieved by proper tuning of the isolators 12. The springs 44, 46 prevent or reduce further descent of the container 14 load after the majority of the isolator 12 travel has been consumed in the descent of the container 14 load.

It will be understood that although the isolators 12 and support assembly 25 described herein generally provide for vertical protection during the transfer of containers on ships, the same components, configurations and principles may be employed to provide for protection in any and all directions and orientations.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A shock isolation system comprising:
at least one isolator configured to be removably secured to an exterior of a container, the at least one isolator having a first end proximate a support surface and an opposing second end distal from the support surface;
at least one foot in communication with the at least one isolator and configured to contact the support surface; and
a support assembly proximate the first end of the at least one isolator, the support assembly being configured to support the container and comprising a plurality of support members pivotably connected to each other about a plurality of joints,
wherein in a stowed configuration of the system, the at least one isolator is in the contracted position and a bottom end of the container is spaced apart from the at least one foot at a first distance, and
wherein in a deployed configuration of the system, the at least one isolator is in the expanded position and the bottom end of the container is spaced apart from the at least one foot at a second distance which is greater than the first distance.

2. The shock isolation system of claim 1, wherein a volume of space occupied by the stowed configuration of the system is smaller than a volume of space occupied by the deployed configuration of the system.

3. The shock isolation system of claim 1, wherein, in the deployed configuration of the system, the at least one isolator is pivoted to extend at an angle relative to the container.

4. The shock isolation system of claim 1, wherein the at least one foot directly contacts the first end of the at least one isolator.

5. The shock isolation system of claim 1, wherein the at least one isolator comprises a first rod telescopingly received within a second rod.

6. The shock isolation system of claim 5, wherein the first rod is spring-loaded relative to the second rod.

7. The shock isolation system of claim 5, further comprising a third rod telescopingly received with the second rod.

8. The shock isolation system of claim 7, wherein the third rod is telescopingly received within the first rod.

9. The shock isolation system of claim 8, wherein the third rod is spring-loaded relative to the second rod.

10. The shock isolation system of claim 8, further comprising a handle provided at one end of the third rod distal from the support surface.

11. The shock isolation system of claim 1, comprising a pair of isolators.

12. The shock isolation system of claim 1, wherein at least two isolators and two containers are stacked along a direction extending perpendicular to the support surface to form a shock isolation assembly.

13. The shock isolation system of claim 1, wherein in the stowed configuration of the system, the plurality of support members are in a folded configuration, and wherein in the deployed configuration of the system, the plurality of support members are in an unfolded configuration.

14. The shock isolation system of claim 1, wherein the at least one isolator is a hydraulic isolator.

* * * * *